T. MUNN.
HOOF PROTECTOR ATTACHMENT FOR HORSESHOES.
APPLICATION FILED DEC. 22, 1916.
1,280,814.
Patented Oct. 8, 1918.
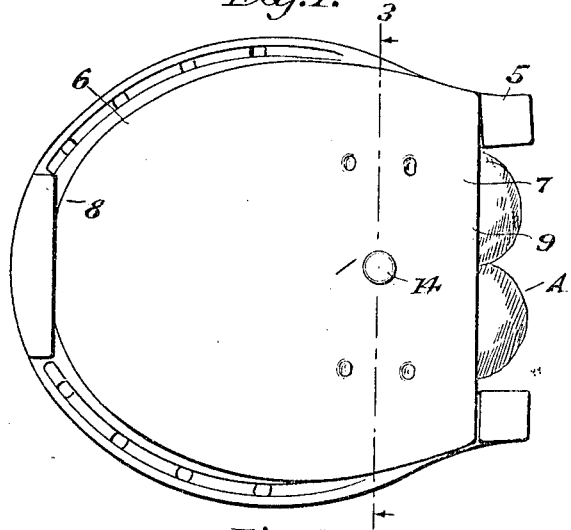
*Fig. 1.*
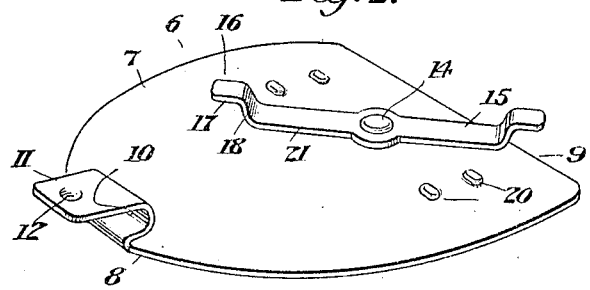
*Fig. 2.*
*Fig. 3.*
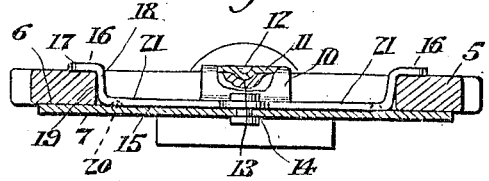
WITNESSES
INVENTOR
*Thomas Munn*
BY *Victor J. Evans*
ATTORNEY

UNITED STATES PATENT OFFICE.

THOMAS MUNN, OF SAULT STE. MARIE, MICHIGAN.

HOOF-PROTECTOR ATTACHMENT FOR HORSESHOES.

1,280,814.  Specification of Letters Patent.  Patented Oct. 8, 1918.

Application filed December 22, 1916. Serial No. 138,450.

*To all whom it may concern:*

Be it known that I, THOMAS MUNN, a citizen of the United States, residing at Sault Ste. Marie, in the county of Chippewa and State of Michigan, have invented new and useful Improvements in Hoof-Protector Attachments for Horseshoes, of which the following is a specification.

The present invention contemplates the production of an attachment for horseshoes and particularly to that class thereunder known as hoof protectors.

The primary object of the present invention resides in the provision of a hoof protector of the above-stated character, wherein means are employed for effecting a quick and firm connection or disconnection of the protector to the horseshoe and so attaching the protector as to prevent injury of the animal's hoof by nails or other sharp objects, and further preventing snow from adhering to the shoe under the hoof of the animal.

With the above and other objects in view, the invention consists in the novel features, details of construction and combination of parts which will hereinafter be more fully set forth, illustrated in the accompanying drawing and pointed out in the appended claim.

Figure 1 is a bottom plan view of a horse's hoof with the protector applied thereto;

Fig. 2 is a perspective view of the protector; and

Fig. 3 is a transverse section taken on line 3—3 of Fig. 1.

Referring more particularly to the accompanying drawing, in which like characters of reference refer to corresponding parts in the several views, A denotes the representation of a horse's hoof with the horseshoe 5 applied thereto.

The hoof protector denoted generally by the reference character 6 is designed to facilitate the same being attached to the horseshoe to prevent injury to the animal's hoof by nails or other sharp obstructions; and to this end, the said protector embodies a flat thin metal plate 7 of a configuration to cover the bottom of the hoof and also to partly cover the ground face of the horseshoe. Therefore, I have shown this plate as provided with a curved toe portion 8 and a straight heel portion 9, while the side portions of the plate are of convexed form to conform with the configuration of the horseshoe 5.

10 indicates a U-shaped clip having one leg thereof formed integral with the toe portion 8 of the plate and extending back over said plate. The other leg 11 is formed with a tip 12 near its end, adapted when the clip 10 is engaged with the toe portion of the shoe, to fit within the depression 13 formed in the toe portion of the shoe, thus holding the toe portion 8 of the plate firmly engaged with the toe portion of the shoe. As will be seen the clip embraces the inner edge of the toe of the shoe. The plate upon the engagement of the clip 10 with the shoe, will dispose the straight heel portion 9 thereof in adjacent relation with the toe calks of the shoe, thus to an extent preventing any accidental longitudinal movement of the protector with respect to said shoe.

Pivotally connected to the inner face of the plate 7 at a point in alinement with the clip 10, and through the medium of the pin 14, is a locking bar 15 adapting the bar to be rotated in opposite directions with respect to the plate, in order that the upwardly and outwardly bent ends of the bar may be readily forced into locking engagement with the inner face of the horseshoe and the animal's hoof. The L-shaped extremities denoted by the character 16, when in locking position, have their horizontal portions 17 inserted between the opposed portions of the shoe and hoof of the animal, while the vertical portions 18 frictionally bind against the inner side portions 19 of the shoe, establishing a firm locking action of the protector with said shoe. However, to assure the locking bar against accidental rotary movement, I have provided on the inner face of the plate opposite pairs of horizontally alined spaced lugs 20, and as is obvious from the disclosure, when the locking bar 15 assumes a locked position, its arms 21, owing to the resilient nature thereof, will be held between said lugs and thus establish the locking action of the bar against any accidental rotary movements.

From the foregoing description, taken in connection with the accompanying drawing, the advantages of construction and the method of operation will be readily apparent to those skilled in the art to which the invention relates, and while I have described the principles of operation of the invention, together with the device which I now consider to be the best embodiment thereof, I desire to have it understood that the device shown is merely illustrative and that such changes may be made when desired as are within the scope of the appended claim.

What is claimed as new, is:

A hoof protector comprising a plate adapted to engage the ground face of the horseshoe, a U-shaped clip having one leg formed integral with the front end of said plate and extending back over the same, said clip adapted to embrace the inner edge of the toe portion of the shoe and having a tip near the end of its other leg to engage with a depression on the hoof side of the shoe, and a pivoted locking bar adjacent the heel portion of the plate having its ends bent upwardly and outwardly to engage the inner edge and hoof face of the shoe adjacent each heel portion.

In testimony whereof I affix my signature.

THOMAS MUNN.

Copies of this patent may be obtained for five cents each, by addressing the "Commissioner of Patents, Washington, D. C."